United States Patent
Pidutti et al.

(10) Patent No.: US 6,297,919 B1
(45) Date of Patent: Oct. 2, 2001

(54) WRITE HEAD WITH SWITCHABLE IMPEDANCE AND METHOD FOR OPERATING SAME

(75) Inventors: Albino Pidutti, Udine (IT); Axel Alegre de La Soujeole, Scott's Valley, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 08/957,424

(22) Filed: Oct. 24, 1997

(51) Int. Cl.[7] ................................................ G11B 5/09
(52) U.S. Cl. .................................. 360/46; 360/68
(58) Field of Search ................... 360/46, 68, 61

(56) References Cited

U.S. PATENT DOCUMENTS

| | | | | |
|---|---|---|---|---|
| 5,357,379 | * | 10/1994 | Gower | 360/46 |
| 5,363,249 | * | 11/1994 | Fitzmorris | 360/46 |
| 5,680,264 | * | 10/1997 | Yamagishi | 360/46 |
| 5,739,706 | * | 4/1998 | Okamoto | 360/46 |
| 5,822,141 | * | 10/1998 | Chung et al. | 360/46 |

* cited by examiner

Primary Examiner—Alan T. Faber
(74) Attorney, Agent, or Firm—David V. Carlson; Theodore E. Galanthay

(57) ABSTRACT

A write head is described having a switchable damping resistance coupled in parallel with an inductor. The damping resistance is decoupled from the inductor by rendering a transistor nonconductive when a direction of current in the inductor changes. The damping resistance is then coupled to the inductor before oscillations begin in the current in the inductor. The decoupling of the damping resistor eliminates power dissipation in the damping resistor during a change in the direction of current in the inductor.

15 Claims, 9 Drawing Sheets

WRITE HEAD WITH SWITCHABLE IMPEDANCE AND METHOD FOR OPERATING SAME

TECHNICAL FIELD

The present invention relates generally to write heads for writing data to a magnetic storage medium, and more particularly, to a write head with a switchable impedance.

BACKGROUND OF THE INVENTION

Write heads are devices which convert an electrical signal into a magnetic force which magnetizes a localized area of a magnetic storage medium such as a surface of a magnetic disk. The surface of the disk is magnetized in different directions according to a pattern derived from a code to store data on the disk.

A diagram of a conventional write head 8 is shown in FIG. 1. A coiled inductor 10 is wrapped around a magnetic core 12 which is suspended above a magnetic disk 14. The core 12 includes a gap 16. Current is drawn through the inductor 10 in a forward direction which induces a forward magnetic field in the core 12. The forward magnetic field traverses the gap 16 near a top surface 18 of the disk 14 and magnetizes the surface 18 in a forward direction. The direction of current in the inductor 10 may be reversed to generate a reverse magnetic field in the core 12. The surface 18 of the disk 14 near the gap 16 is then magnetized in a reverse direction. Periodic changes in the direction of the magnetism in the surface of the disk 14 may be created by moving the write head 8 relative to the disk 14 and changing the direction of current in the inductor 10 to store data according to well-known methods.

A conventional circuit 20 for controlling an inductor 22 for a write head is shown in FIG. 2. An H-bridge circuit 24 drives current into the inductor 22 according to a control signal generated by a control logic circuit 26. The H-bridge circuit 24 includes a first high-side transistor 28 and a first low-side transistor 30 connected in series between a voltage source $V_{cc}$ and a ground voltage reference. The H-bridge circuit 24 also includes a second high-side transistor 32 and a second low-side transistor 34 connected in series between the voltage source $V_{cc}$ and the ground voltage reference. The connection between the first high-side transistor 28 and the first low-side transistor 30 includes a first terminal 36 of the H-bridge circuit 24. Similarly, the connection between the second high-side transistor 32 and the second low-side transistor 34 includes a second terminal 38 of the H-bridge circuit 24.

The H-bridge circuit 24 drives current through the inductor 22 according to the control signal generated by the control logic circuit 26 and provided from a port 40. The control signal generated by the control logic circuit 26 is a digital control signal having a high voltage or a low voltage which controls a direction of current driven in the inductor 22. If the control signal is high, the high control signal is applied to render the second high side transistor 32 and the first low side transistor 30 conductive. The high control signal is inverted by an inverter 42 and applied to render the first high-side transistor 28 nonconductive. The high control signal is also inverted by an inverter 44 and is applied to the second low-side transistor 34 to render it nonconductive. Current is then directed from the voltage source $V_{cc}$ through the second high side transistor 32, the second terminal 38, the inductor 22, the first terminal 36, and then through the first low side transistor 30 to the ground voltage reference. As current flows through the inductor 22 from the second terminal 38 to the first terminal 36, a magnetic field is generated in a core wrapped by the inductor 22 in a first direction such that the core may magnetize a surface of a magnetic disk in the first direction.

Periodically the control logic circuit 26 reverses the voltage of the control signal provided at the port 40 to change the direction of the current in the inductor 22. If the control signal is switched from a high voltage to a low voltage, the second high side transistor 32 and the first low side transistor 30 are rendered nonconductive. The control signal is inverted by the inverters 42 and 44 such that the first high side transistor 28 and the second low side transistor 34 are rendered conductive. Current is then directed from the voltage source $V_{cc}$ through the first high side transistor 28, the first terminal 36, the inductor 22, the second terminal 38, and the second low side transistor 34 to the ground voltage reference. As current flows in the inductor 22 from the first terminal 36 to the second terminal 38 a magnetic field is generated in the core wrapped by the inductor 22 in a second direction. The core is now capable of magnetizing the surface of the magnetic disk in the second direction. The voltage of the control signal is switched rapidly when the circuit 20 is operating to change the direction of the magnetism in the surface of the disk such that data may be stored in the disk as described above.

When the direction of current in the inductor 22 is changed in response to a change in the control signal, oscillations occur in the current in the inductor 22 due to the existence of parasitic effects in the circuit 20. A plot of the current in the inductor 22 during a change in the control signal is shown in FIG. 3. The moment the control signal changes the current in the inductor 22 begins to change direction as shown by a point 50. Following the change in the control signal the current in the inductor 22 oscillates with an overshoot 52, an undershoot 54, and an overshoot 56 before settling to a steady current 58. The undershoot 54 is particularly hazardous because it can demagnetize the core wrapped by the inductor 22 and erase data stored nearby in a magnetic disk. The overshoot 52 may also, under some circumstances, put data stored on the magnetic disk at risk.

A conventional method for minimizing the oscillations shown in FIG. 3 is a modified circuit 60 shown in FIG. 4. The circuit 60 is similar to the circuit 20 shown in FIG. 2, and elements common to both circuits 60 and 20 have the same reference numerals.

The circuit 60 includes a damping resistor 62 connected between the first terminal 36 and the second terminal 38. The damping resistor 62 is thus coupled in parallel with the inductor 22. When the circuit 60 is operating to provide current to the inductor 22, some current is drawn through the damping resistor 62 bypassing the inductor 22. The damping resistor 62 damps oscillations in the current in the inductor 22 after the direction of the current has been changed. In particular, the damping resistor 62 reduces the number of oscillations and substantially minimizes any undershoot in the oscillations in the current in the inductor 22.

The reduction in the number of oscillations permits the current in the inductor 22 to settle to a steady amount more rapidly after a change in direction. After a steady current is reached an area of a magnetic disk is magnetized in a selected direction and the direction of the current in the inductor 22 may be reversed. The reduction in oscillations permits an increase in the frequency of directional changes in the current in the inductor 22 and therewith a reduction in the period of time needed to write data to a magnetic disk. In other words, one benefit of the damping resistor 62 is that the writing frequency of the write head may be increased.

While the damping resistor 62 moderates oscillations in current in the inductor 22, it also dissipates power as current is drawn through it. When the current in the inductor 22 is steady, there is a small voltage drop between the first terminal 36 and the second terminal 38 and power dissipation in the damping resistor 62 is minimal. However, when the direction of current in the inductor 22 is changed, a substantially higher voltage is applied across the inductor 22 and the damping resistor 62. As a result, the damping resistor 62 dissipates a substantial amount of power when the direction of the current in the inductor 22 is changed.

SUMMARY OF THE INVENTION

In accordance with the present invention, a write head with a switchable impedance is provided which permits a reduction in power dissipation during operation of the write head. The write head includes an inductor coupled to a driving circuit which is structured to provide current to the inductor in a plurality of directions and a switchable impedance element structured to be switched from a parallel coupling with the inductor to an open circuit. The switchable impedance element may be a switch coupled to a resistor where the switch and the resistor are coupled in parallel with the inductor.

Further in accordance with the present invention, a method is provided for writing data to a magnetic storage medium from a write head having an inductor. Current is provided to the inductor in a first direction and an impedance element is coupled to the inductor. The impedance element is then decoupled from the inductor and current is provided to the inductor in a second direction. The impedance element is then coupled to the inductor again.

DETAILED DESCRIPTION OF THE INVENTION

Figure 1:
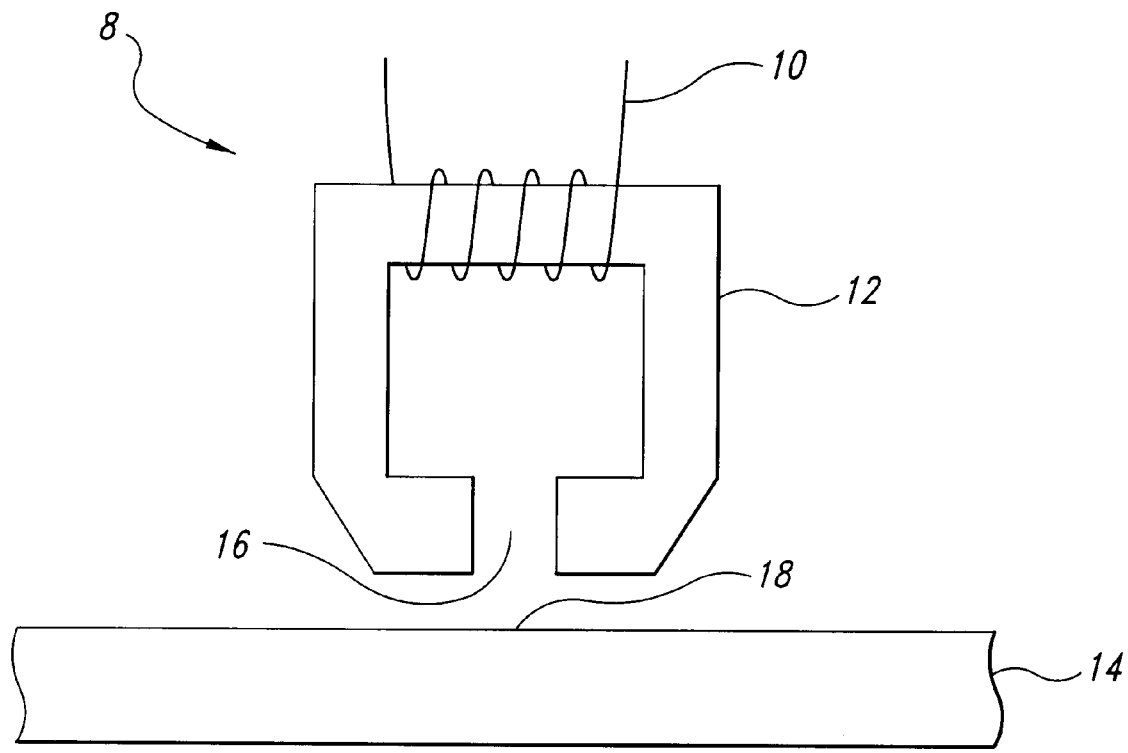
FIG. 1 is a side view of a write head and a magnetic disk according to the prior art.
Figure 2:
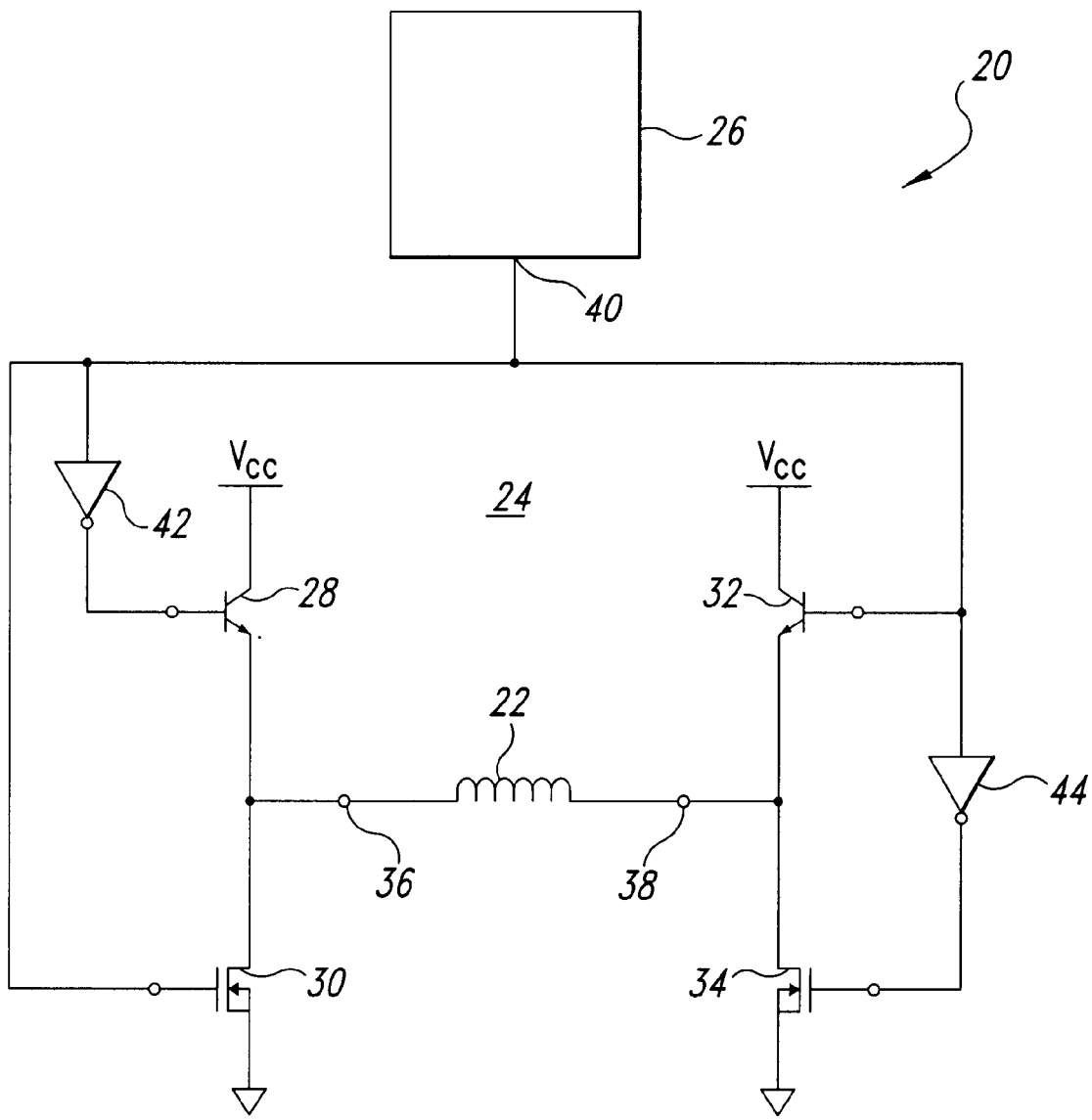
FIG. 2 is an electrical schematic diagram of a circuit for controlling a write head according to the prior art.
Figure 3:
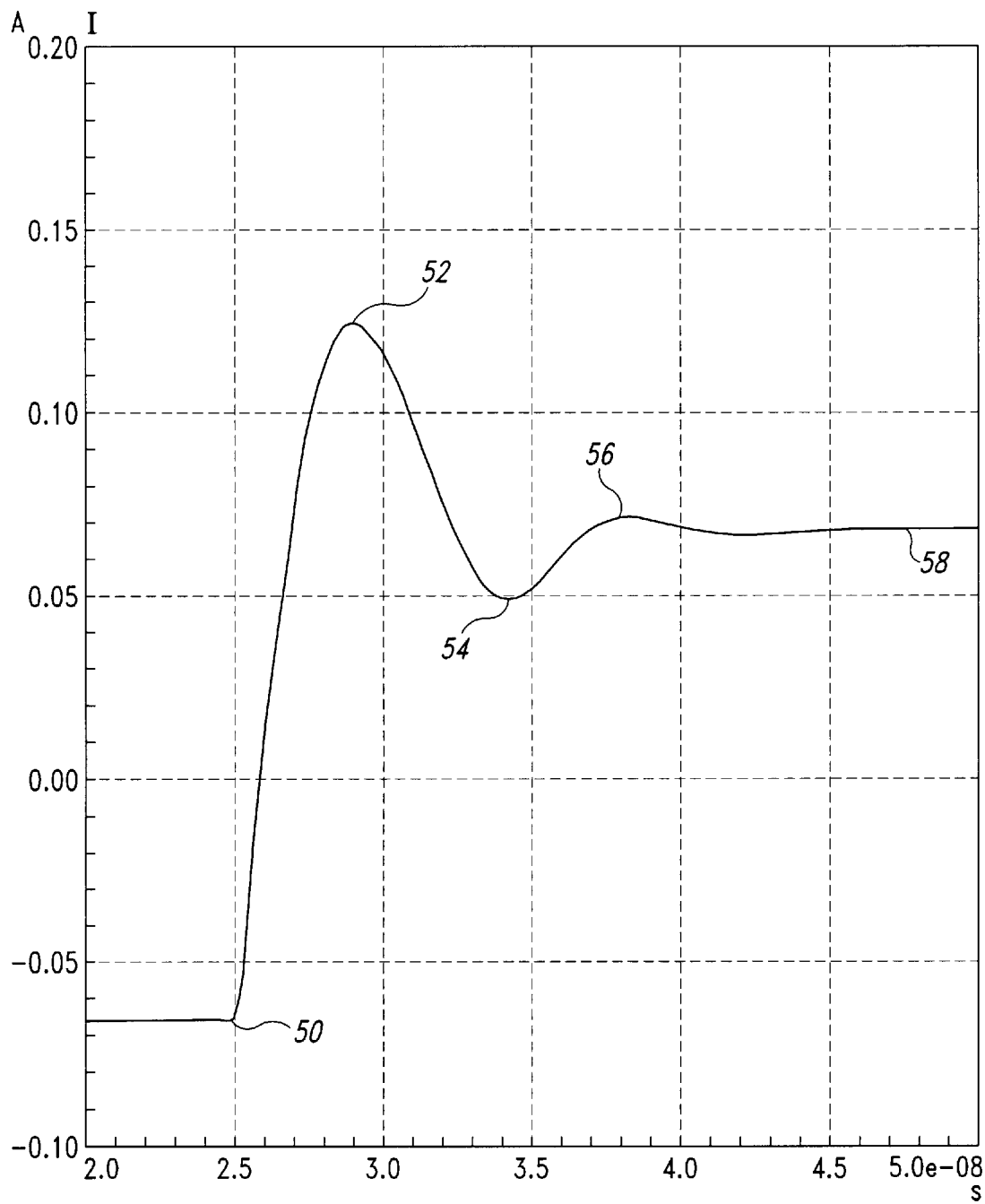
FIG. 3 is a plot of current in an inductor for a write head controlled by the circuit shown in FIG. 2 according to the prior art.
Figure 4:
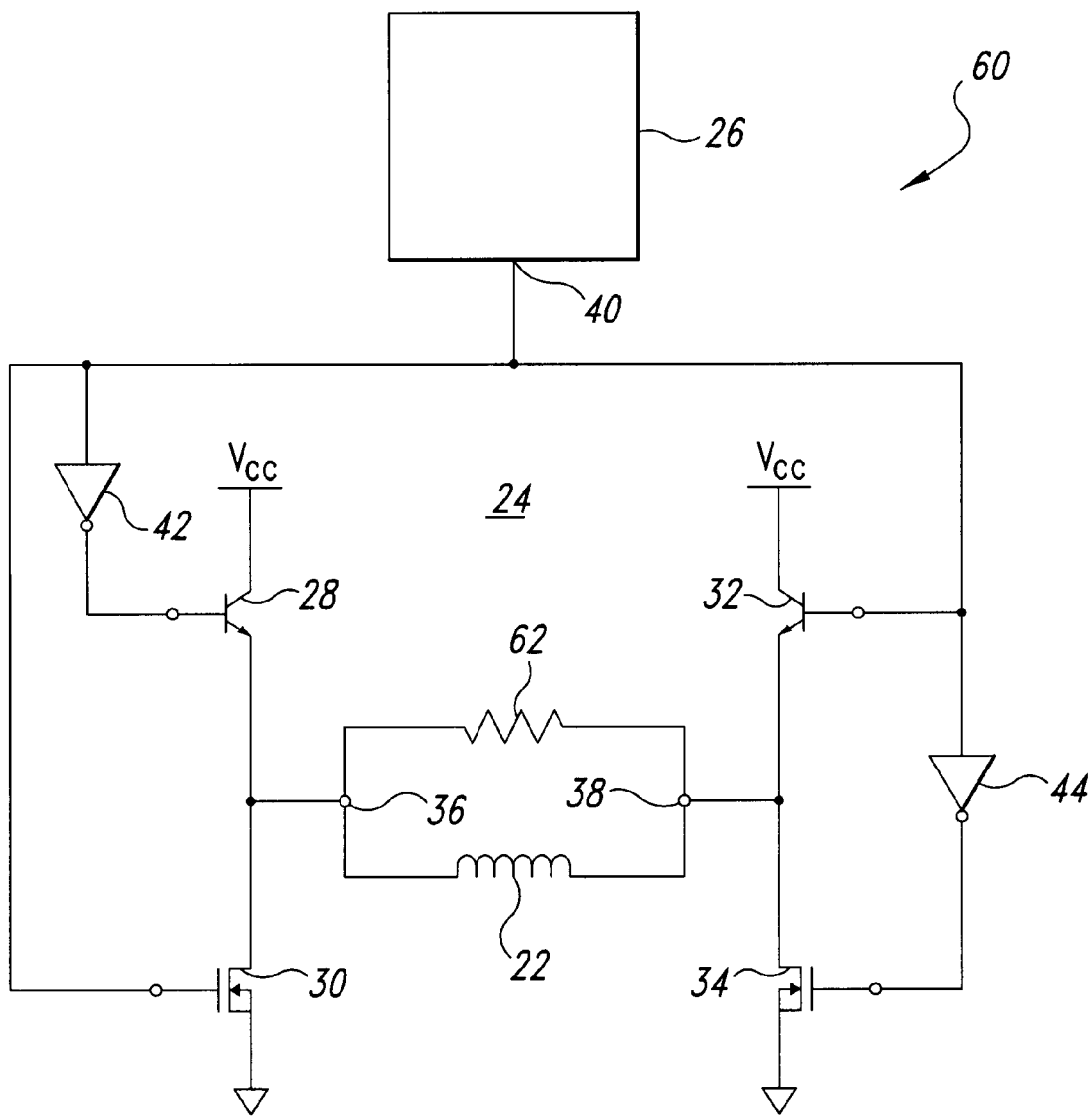
FIG. 4 is an electrical schematic diagram of a circuit for controlling a write head with a damping resistor according to the prior art.
Figure 5:
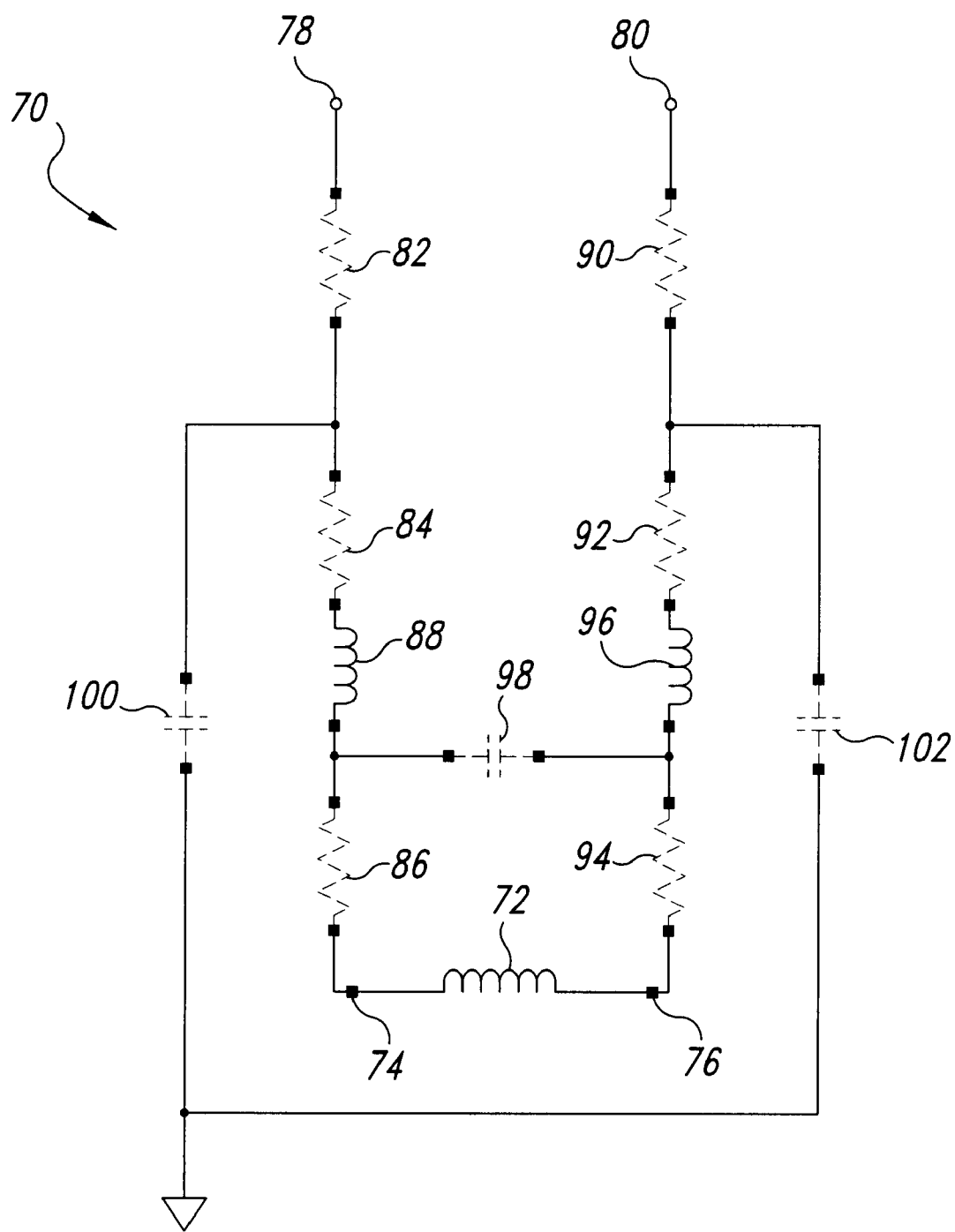
FIG. 5 is an electrical schematic diagram of an inductor in a write head including parasitic elements according to a first embodiment of the invention.

A circuit 70 shown in FIG. 5 represents a model for parasitic effects associated with an inductor 72 in a write head according to a first embodiment of the invention. In the model the inductor 72 has two terminals 74 and 76 and is coupled between a first terminal 78 and a second terminal 80 in an H-bridge circuit. The parasitic effects which occur during an operation of the write head may be represented by a number of parasitic elements shown by dashed lines in the circuit 70. Three resistors 82, 84 and 86, and an inductor 88 represent parasitic effects in a coupling between the first terminal 78 and the terminal 74. Likewise, three resistors 90, 92, and 94, and an inductor 96 represent parasitic effects in a coupling between the second terminal 80 and the terminal 76. Parasitic capacitance effects in the circuit 70 are represented by the following elements. A capacitor 98 is coupled between the resistors 86 and 94; a capacitor 100 is coupled between the resistors 82 and 84 and a ground voltage reference; and a capacitor 102 is coupled between the resistors 90 and 92 and the ground voltage reference.

Figure 6:
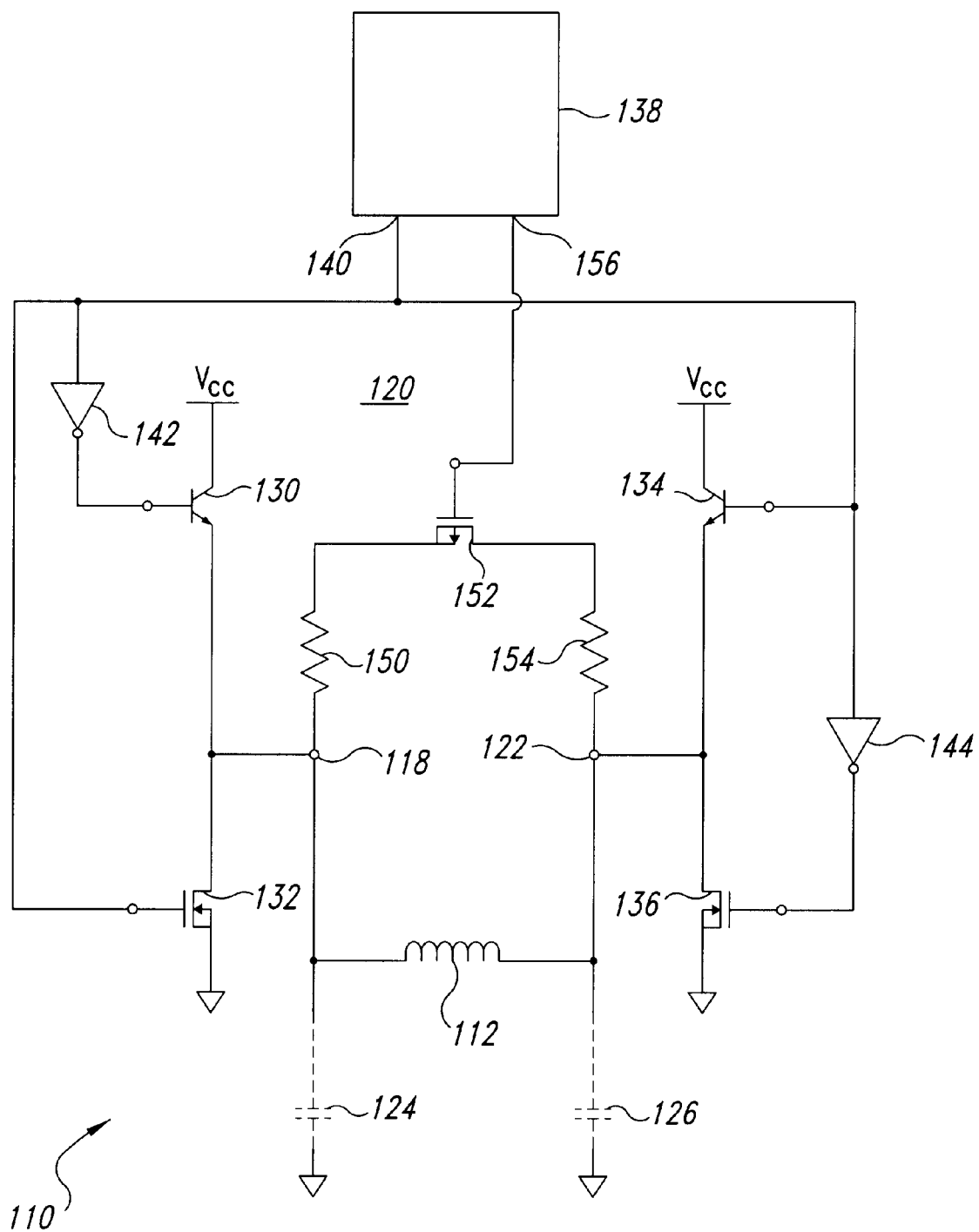
FIG. 6 is an electrical schematic diagram of a circuit for controlling a write head with a switchable impedance according to the first embodiment of the invention.

A circuit 110 for controlling a write head according to the first embodiment of the invention is shown in FIG. 6. An inductor 112 is coupled between a first terminal 118 of an H-bridge circuit 120 and a second terminal 122 of the H-bridge circuit 120. A first parasitic capacitor 124 shown in dashed lines is coupled between the first terminal 118 and a ground voltage reference, and a second parasitic capacitor 126 shown in dashed lines is coupled between the second terminal 122 and the ground voltage reference. The parasitic capacitors 124 and 126 represent parasitic effects which most significantly affect oscillations in current in the inductor 112. Other parasitic effects exist in the circuit 110, but have not been shown in detail in order not to unnecessarily obscure the invention.

The H-bridge circuit 120 provides current to the inductor 112 and includes the following transistors. A first high side transistor 130 is a BJT transistor having a collector coupled to a voltage source $V_{cc}$, a base terminal, and an emitter coupled to the first terminal 118. A first low side transistor 132 is an n-channel MOS transistor having a drain coupled to the first terminal 118, a gate terminal, and a source coupled to the ground voltage reference. A second high side transistor 134 is a BJT transistor having a collector coupled to the voltage source $V_{cc}$, a base terminal, and an emitter coupled to the second terminal 122. A second low side transistor 136 is an n-channel MOS transistor having a drain coupled to the second terminal 122, a gate terminal, and a source coupled to the ground voltage reference.

The transistors 130, 132, 134, and 136 are controlled by a control signal generated by a control logic circuit 138 and provided at a port 140. The control signal is a digital control signal having either a high voltage or a low voltage. The high voltage is sufficient to render any of the transistors 130, 132, 134, and 136 conductive, while the low voltage is sufficient to render any of the transistors 130, 132, 134, and 136 nonconductive. The control signal provided at the port 140 is applied to the gate terminal of the first low side transistor 132 and to the base terminal of the second high side transistor 134. The control signal is inverted by an inverter 142 to generate an inverted control signal which is applied to the base terminal of the first high side transistor 130. Similarly, the control signal is inverted by an inverter 144 to generate the inverted control signal which is applied to the gate terminal of the second low side transistor 136.

The circuit 110 also includes a first damping resistor 150, a switch transistor 152 which is a p-channel MOS transistor, and a second damping resistor 154 connected in parallel with the inductor 112 between the first terminal 118 and the second terminal 122. A first end of the first damping resistor 150 is connected to the first terminal 118, and a second end of the first damping resistor 150 is connected to a source of the switch transistor 152. A drain of the switch transistor 152 is connected to a first end of the second damping resistor 154, and a second end of the second damping resistor 154 is connected to the second terminal 122. The switch transistor 152 has a gate terminal which is coupled to a port 156 of the control logic circuit 138. The control logic circuit 138 generates a switch control signal which is provided from the port 156 to the gate terminal of the switch transistor 152. The switch control signal is a digital control signal having either a high voltage value or a low voltage value. The high voltage value of the switch control signal is sufficient to render the switch transistor 152 nonconductive, and the low voltage value of the switch control signal renders the switch transistor 152 conductive.

The operation of the circuit 110 will now be described with reference to a timing diagram shown in FIG. 7. The timing diagram shows, three different square wave voltage signals, labeled, from top to bottom, the switch control signal, the control signal, and the inverted control signal each shown as respective relative voltage levels over time. When the control signal is high, the inverted control signal is low, and when the control signal is low the inverted control signal is high. The switch control signal is held low until the control signal undergoes a transition, at which point the switch control signal is brought high for a short period of time after which it is returned low.

The control signal generated by the control logic circuit 138 and provided at the port 140 is applied to the gate terminal of the first low side transistor 132 and to the base terminal of the second high side transistor 134. The inverted control signal is generated by the inverter 142 and applied to the base terminal of the first high side transistor 130. The inverted control signal is also generated by the inverter 144 and applied to the gate terminal of the second low side transistor 136.

When the control signal is high and the inverted control signal is low, the second high transistor 134 and the first low side transistor 132 are rendered conductive while the other transistors 130 and 136 are rendered nonconductive. As a result, current flows from the voltage source $V_{cc}$ through the second high side transistor 134, the second terminal 122, the inductor 112, the first terminal 118, and the first low side transistor 132 to the ground voltage reference. The current in the inductor 112 results in a magnetic field in a core (not shown) wrapped by the inductor 112 in a first direction which is capable of magnetizing a surface of a magnetic disk in the first direction.

The control logic circuit 138 may subsequently provide a low control signal to change the direction of current in the inductor 112. The low control signal is provided from the port 140 and is applied to the gate terminal of the first low side transistor 132 and to the base terminal of the second high side transistor 134. The low control signal is inverted by the inverter 142 to generate a high inverted control signal which is applied to the base terminal of the first high side transistor 130. Likewise, the low control signal is inverted by the inverter 144 to generate a high inverted control signal which is applied to the gate terminal of the second low side transistor 136. As a result, the first high side transistor 130 and the second low side transistor 136 are rendered conductive while the other transistors 132 and 134 are rendered nonconductive. Current flows from the voltage source $V_{cc}$ through the first high side transistor 130, the first terminal 118, the inductor 112, the second terminal 122, and the second low side transistor 136 to the ground voltage reference. The current in the inductor 112 results in a magnetic field in the core wrapped by the inductor 112 in a second direction which is capable of magnetizing the surface of the magnetic disk in the second direction.

The control logic circuit 138 generates the control signal to be high or low based on data to be stored in the magnetic disk according to one of many well-known codes. The control signal indicates the direction of current in the inductor 112 and therefore the direction of the magnetic field in the core wrapped by the inductor 112. When the write head passes over a magnetic disk, which is typically rotating, surface areas of the magnetic disk are magnetized according to the direction of the magnetic field in the core wrapped by the inductor 112. The control signal is switched between high and low according to the code to induce a pattern of alternating directions of magnetism in the magnetic disk which represents the data to be stored.

The signals applied to the transistors 130, 132, 134, and 136 may be generated by any known control circuitry for an H-bridge circuit. Furthermore, the control signal and the inverted control signal shown in FIG. 7 are merely examples of mutually opposed square wave signals. The signals applied to the transistors 130, 132, 134, and 136 during operation of the circuit 110 will follow a pattern based on the data to be written to the magnetic disk.

The first damping resistor 150 and the second damping resistor 154 provide damping to minimize oscillations in the current in the inductor 112 when the direction of the current in the inductor 112 changes as required by the data to be stored. The switch transistor 152 is provided to decouple the first and second damping resistors 150 and 154 from the inductor 112 during selected periods of operation of the circuit 110. When the switch control signal is low and the switch transistor 152 is rendered conductive, the first and second damping resistors 150 and 154 are coupled in parallel with the inductor 112 between the first terminal 118 and the second terminal 122 to draw current and provide damping for the current in the inductor 112. When the switch control signal is high and the switch transistor 152 is rendered nonconductive, an open circuit is created between the first damping resistor 150 and the second damping resistor 154. The damping resistors 150 and 154 do not dissipate any power and current in the inductor 112 does not benefit from the damping effect of the damping resistors 150 and 154 when the switch transistor 152 is in a nonconductive state.

When the switch transistor 152 is in a conductive state, the damping resistors 150 and 154 dissipate power relative to the current passing through them. When the current in the inductor 112 has reached a steady value, the power dissipated by the damping resistors 150 and 154 is not significant. At the beginning of a change of direction in the current in the inductor 112 the voltage difference between the first terminal 118 and the second terminal 122 is at a maximum and, as a result, the potential for power dissipation in the damping resistors 150 and 154 is also at a maximum. Therefore, according to the embodiment of the invention, the control logic circuit 138 generates a high switch control signal at the port 156 to render the switch transistor 152 nonconductive for a short period of time concurrent with each transition of the control signal.

Figure 7:
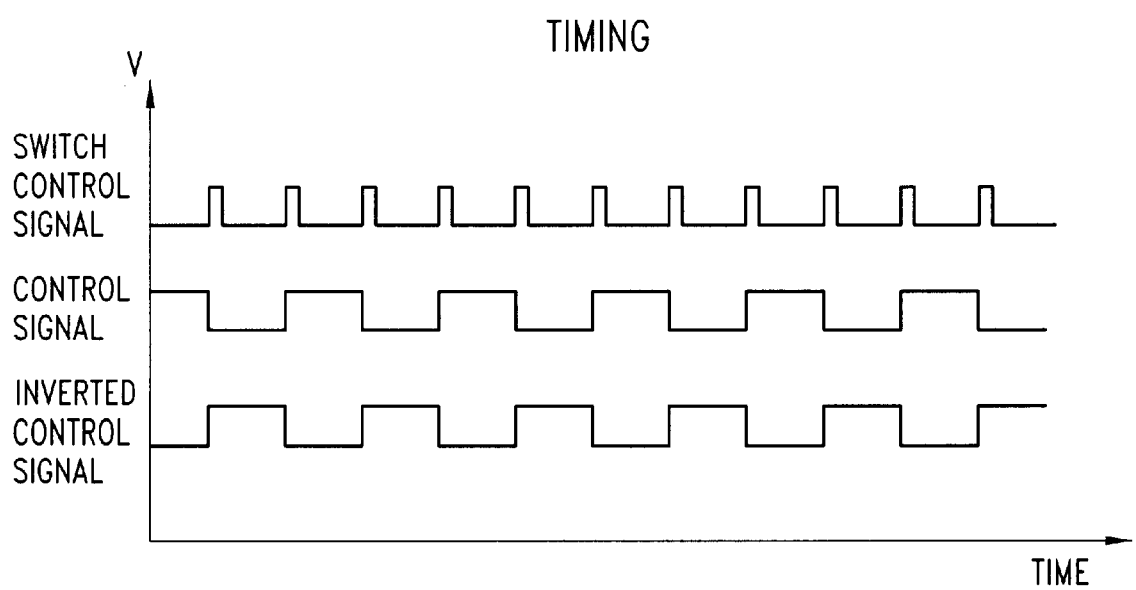
FIG. 7 is a timing diagram of control signals generated in the circuit shown in FIG. 6 according to the first embodiment of the invention.

The switch control signal is shown with the control signal in FIG. 7. The switch control signal rises along with each transition in the control signal and remains high following the transition for a short period of time. The switch control signal is then brought low. As a result, an open circuit is created between the first damping resistor 150 and the second damping resistor 154 when the voltage drop across the inductor 112 is at a maximum and the direction of current in the inductor 112 is changing. The switch control signal is returned to low and the switch transistor 152 is rendered conductive before oscillations in the current in the inductor 112 begin to permit the damping resistors 150 and 154 to reduce the oscillations.

Figure 8:
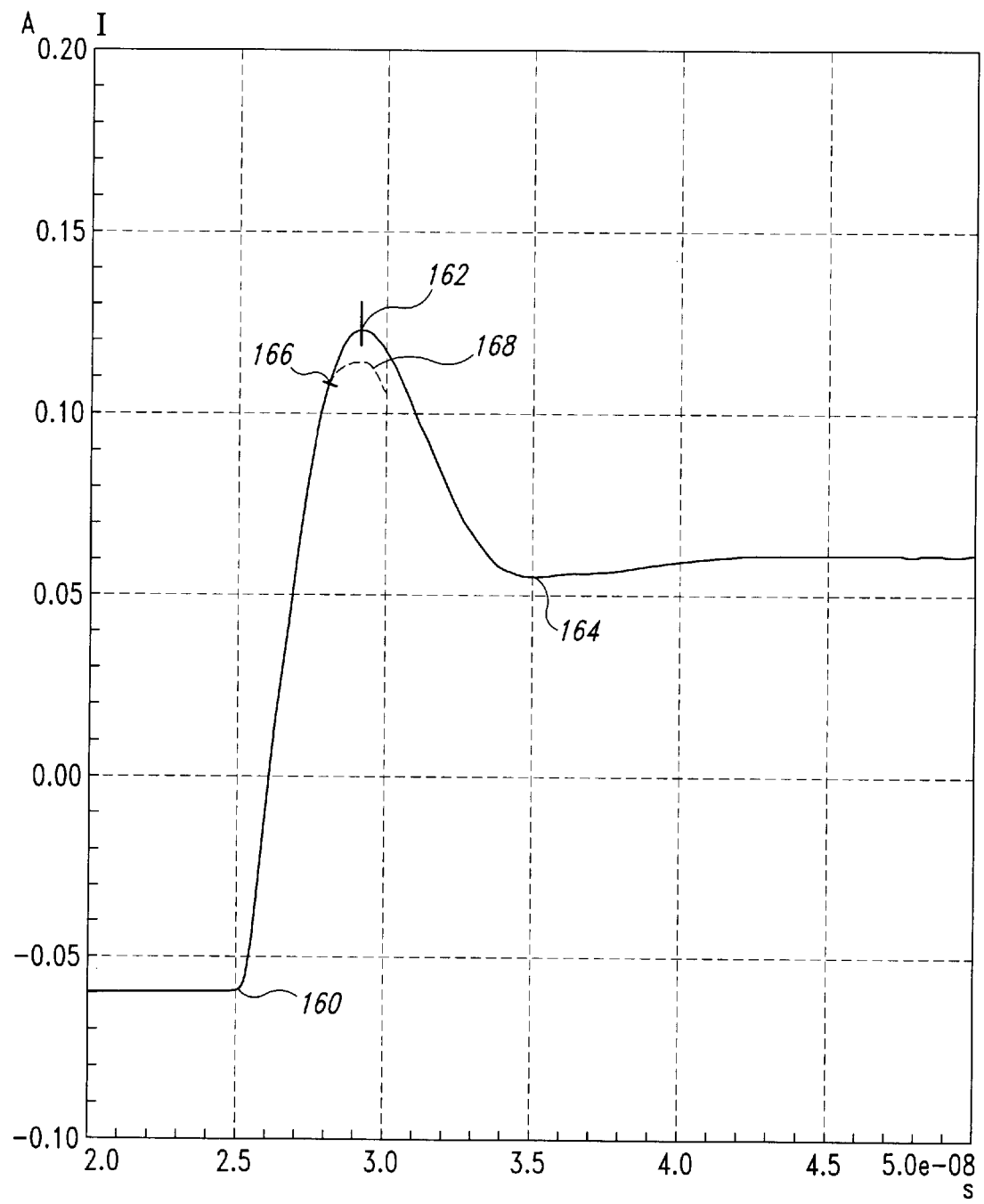
FIG. 8 is a plot of current in an inductor for a write head controlled by the circuit shown in FIG. 6 according to the first embodiment of the invention.

A plot of the current in the inductor 112 of the circuit 110 is shown in FIG. 8. The direction of the current changes from a negative direction to a positive direction beginning at a point 160. The point 160 coincides with a transition in the control signal and a rise in the switch control signal to high. The current begins to oscillate at a point 162 which is a peak of a first overshoot in the current. The switch control signal is returned to low at the point 162. Thereafter, the damping resistors 150 and 154 damp the oscillations in the current in the inductor 112. Both the number of oscillations and the amplitude of the oscillations are reduced. There is a minimal undershoot at a point 164 after which the current settles to a steady value. The undershoot at the point 164 is not substantial enough to cause a loss of data in the magnetic disk. The voltage drop between the first terminal 118 and the second terminal 122 is at a maximum between the points 160 and 162 during which time the switch control signal is high and the damping resistors 150 and 154 are decoupled from the circuit 110.

In a second embodiment of the invention, the switch control signal may be brought low at a point 166 which results in a lower peak overshoot of the oscillations in the current in the inductor 112 than if the switch control signal is brought low at the point 162. The lower peak overshoot is shown as a dashed line 168.

The first embodiment of the invention shown in FIGS. 6 and 7 provides two significant advantages. First, the decoupling of the damping resistors 150 and 154 during the period when the voltage drop between the first terminal 118 and the second terminal 122 is at a maximum reduces power dissipation in the damping resistors 150 and 154. In addition, the decoupling reduces peak currents drawn through the H-bridge circuit 120. As a result, smaller transistors may be used in the H-bridge circuit 120.

Figure 9:
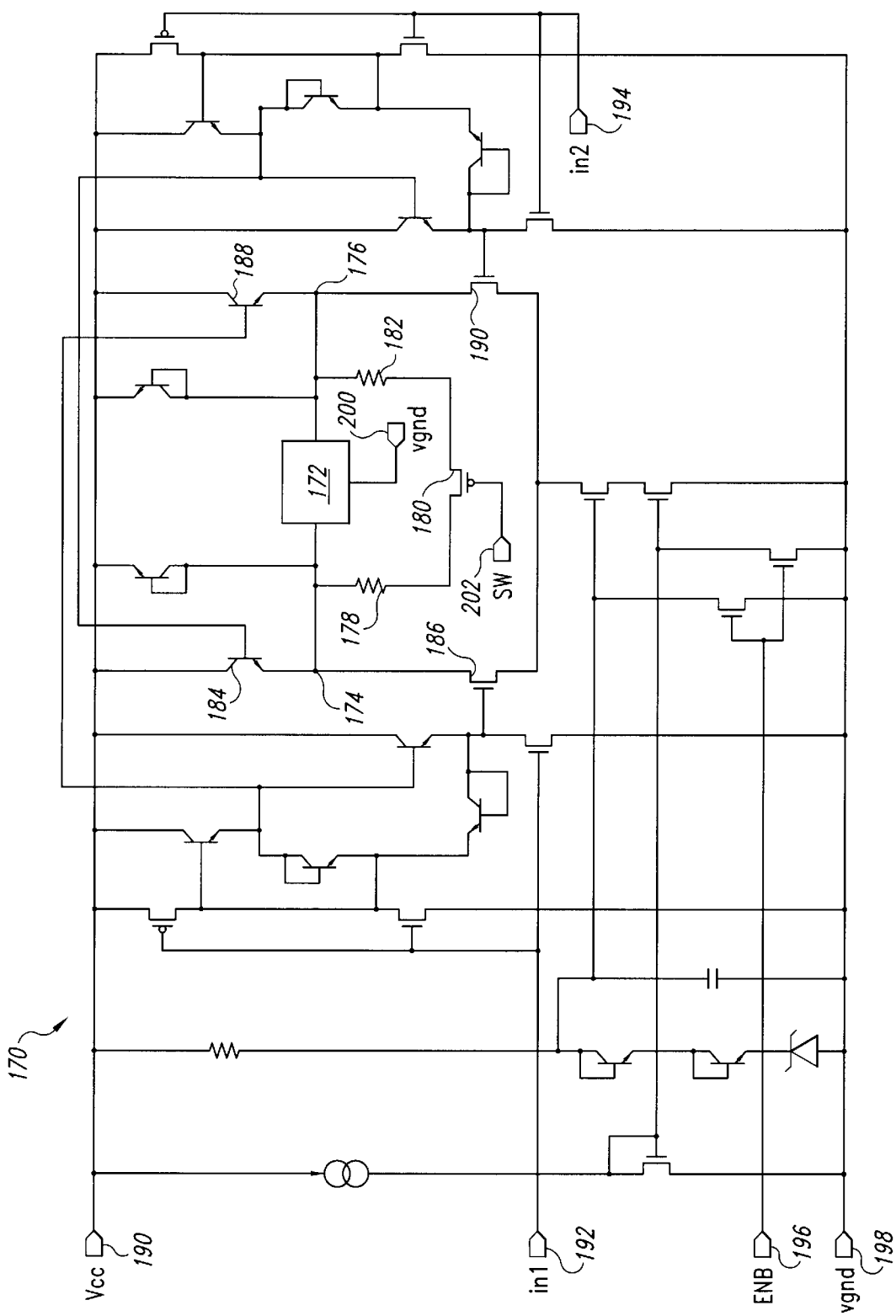
FIG. 9 is an electrical schematic diagram of a circuit for controlling an inductor circuit in a write head with a switchable impedance according to a third embodiment of the invention.

A circuit 170 for controlling an inductor in a write head with a switchable impedance according to a third embodiment of the invention is shown in FIG. 9. The circuit 170 includes an inductor circuit 172 for use in a write head of a type well known in the art coupled between a first terminal 174 and a second terminal 176. Also included are a first damping resistor 178, a switch transistor 180 and a second damping resistor 182 coupled in series between the first terminal 174 and the second terminal 176. The first and second terminals 174 and 176 are part of an H-bridge circuit including a first high side transistor 184, a first low side transistor 186, a second high side transistor 188 and a second low side transistor 190. The first and second high side transistors 184 and 188 are coupled to receive a supply voltage $V_{cc}$ from a pin 190. A signal in 1 similar to the control signal shown in FIG. 7 is applied to a pin 192, and a signal in2 similar to the inverted control signal shown in FIG. 7 is applied to a pin 194. The signals in1 and in2 applied to the pins 192 and 194 govern the conductive state of the four transistors 184, 186, 188 and 190 in the H-bridge circuit. A protection signal ENB is provided at a pin 196 to shut the bridge circuit off when required. A ground voltage reference is coupled to a pin 198 and to a pin 200. A signal SW similar to the switch control signal shown in FIG. 7 is applied to a pin 202 to control a conductive state of the switch transistor 180.

An improved write head with a switchable impedance and a method for operating the improved write head have been described. The details of well-known circuits such as a control logic circuit and other peripheral circuits necessary for the operation of a circuit for controlling the write head have not been shown in detail in order not to unnecessarily obscure the invention. In addition, it will be appreciated that, although several embodiments of the invention have been described above for purposes of illustration, various modifications may be made without deviating from the spirit and scope of the invention. For example, the transistors shown in FIG. 6 may be BJT transistors, MOS transistors or any combination thereof. Also, any combination of one or more switch transistors and one or more damping resistors coupled together may provide a switchable damping resistance for the circuit shown in FIG. 6. The circuitry providing control signals to the transistors in the H-bridge circuit shown in FIG. 6 may be any well-known H-bridge control circuitry. Numerous variations are well within the scope of this invention. Accordingly, the invention is not limited accept as by the appended claims.

What is claimed is:

1. A write head for writing data to a magnetic storage medium comprising:
   an inductor coupled to a driving circuit, the driving circuit being structured to provide current to the inductor in a plurality of directions; and
   a switchable impedance element positioned to be switched from a parallel coupling with the inductor to an open circuit, the switchable impedance element including a first resistor, a second resistor and an MOS transistor connected between the first resistor and the second resistor, the first resistor being coupled to a first terminal of the inductor and the second resistor being coupled to a second terminal of the inductor, the MOS transistor being positioned to connect the two resistors to each other when enabled and disconnect the two resistors from each other, creating an open circuit when disabled.

2. The write head of claim 1 wherein the first terminal of the inductor is connected to a first high-side transistor and to a first low-side transistor in an H-bridge circuit and the second terminal of the inductor is connected to a second high-side transistor and to a second low-side transistor of the H-bridge circuit, the first and second high-side transistors being coupled to a voltage source and the first and second low-side transistors being coupled to a ground voltage reference.

3. A write head circuit comprising:
   an inductor coupled to a core and coupled between first and second terminals of a driving circuit;
   an impedance element and a switch coupled between the first and second terminals of the driving circuit in parallel with the inductor, the impedance element including a first resistor coupled between the first terminal and an MOS transistor and second resistor coupled between the second terminal and the MOS transistor.

4. The circuit of claim 3 wherein the switch and the impedance element are connected in series with each other.

5. The circuit of claim 4 wherein the driving circuit is an H-bridge circuit comprising:
   a first high-side transistor coupled between a first voltage source and the first terminal;
   a first low-side transistor coupled between the first terminal and a second voltage source;

a second high side transistor coupled between the first voltage source and the second terminal; and a second low-side transistor coupled between the second terminal and the second voltage source.

6. A method for writing data to a magnetic storage medium from a write head having an inductor, the method comprising:

providing current to the inductor in a first direction to write data of a first type to the magnetic storage medium;

coupling an impedance element to the inductor;

decoupling the impedance element from the inductor;

providing current to the inductor in a second direction to write data of a second type to the magnetic storage medium; and coupling the impedance element to the inductor.

7. The method of claim 6 wherein the acts of coupling an impedance element to the inductor each comprise the act of coupling the impedance element in parallel with the inductor.

8. The method of claim 6 wherein the acts of coupling an impedance element to the inductor each comprise the act of rendering a switch conductive in series with at least one resistor to couple the switch and the resistor to the inductor in a parallel configuration before oscillations occur in the current provided to the inductor.

9. The method of claim 8 wherein the act of rendering a switch conductive comprises the act of rendering a transistor conductive.

10. The method of claim 8 wherein the act of decoupling the impedance element comprises the act of rendering the switch nonconductive.

11. The method of claim 10 wherein the act of rendering the switch nonconductive comprises the act of rendering a transistor noncondtictive.

12. A method for driving a write head to write data to a magnetic storage medium, the write head including an inductor and a core, the inductor being coupled between a plurality of terminals of an H-bridge circuit, the method comprising:

providing a first control signal to the H-bridge circuit to drive current in the inductor in a first direction;

providing a second control signal to a switch coupled to an impedance element to couple the impedance element to the inductor;

providing a third control signal to the switch coupled to the impedance element to decouple the impedance element from the inductor;

providing a fourth control signal to the H-bridge circuit to drive current in the inductor in a second direction; and providing the second control signal to the switch coupled to the impedance element to couple the impedance element to the inductor.

13. The method of claim 12 wherein the acts of providing the second control signal each comprise the act of providing the second control signal to the switch coupled to the impedance element to couple the impedance element in parallel with the inductor.

14. The method of claim 13 wherein the acts of providing the second control signal each comprise the act of providing the second control signal to a transistor coupled to at least one resistor to render the transistor conductive.

15. The method of claim 13 wherein the acts of providing the second control signal each comprise the act of providing the second control signal to a transistor connected between two resistors in parallel with the inductor to render the transistor conductive before oscillations occur in the current driven in the inductor.

* * * * *